United States Patent [19]

Kutowy et al.

[11] 4,346,126

[45] Aug. 24, 1982

[54] METHOD OF CASTING A REVERSE OSMOSIS OR ULTRAFILTRATION POLYMERIC MEMBRANE

[75] Inventors: Oleh Kutowy, North Gower; William L. Thayer; Srinivasa Sourirajan, both of Ottawa, all of Canada

[73] Assignee: Canadian Patents & Development Ltd., Ottawa, Canada

[21] Appl. No.: 262,686

[22] Filed: May 11, 1981

Related U.S. Application Data

[63] Continuation-in-part of Ser. No. 179,103, Aug. 18, 1980, abandoned.

[30] Foreign Application Priority Data

Sep. 13, 1979 [CA] Canada ................................. 336704

[51] Int. Cl.³ .......................... B05D 5/00; B05D 7/22
[52] U.S. Cl. .................................... 427/209; 427/230; 427/244; 427/246
[58] Field of Search ..................... 210/500.2; 427/230, 427/244, 246, 209; 264/41

[56] References Cited

U.S. PATENT DOCUMENTS 3,676,193 7/1972 Cooper et al. .................... 427/230
3,912,834 10/1975 Imai et al. ..................... 210/500.2 X

*Primary Examiner*—Evan K. Lawrence
*Attorney, Agent, or Firm*—Francis W. Lemon

[57] ABSTRACT

An improvement in the method of casting a reverse osmosis or ultrafiltration polymeric membrane on a wall of porous support having a first, high pressure side under service conditions, and a second, low pressure side under service conditions, wherein the first side is coated with a cellulose ester casting solution to at least partially impregnate the support, solvent carrier of the casting solution is partially evaporated to leave a residue, and then residues adjacent the first and second sides are gelled with a gelation liquid comprising a monohydric alcohol. The improvement comprises gelling the residue adjacent the first side with a gelation liquid which is separate from that used to gel the residue adjacent the second side, and the monohydric alcohol mole fractions of the separate gelation liquid, and their temperatures during gelation, are chosen so that relatively larger pores are formed towards the second side of the porous support. The method is particularly useful for casting tubular, polymeric membranes anchored to the inner surface of a porous, tubular support and where the relatively larger pores are adjacent the outer surface of the porous support.

5 Claims, 6 Drawing Figures 4,346,126

METHOD OF CASTING A REVERSE OSMOSIS OR ULTRAFILTRATION POLYMERIC MEMBRANE

This is a continuation-in-part of application Ser. No. 179,103, filed Aug. 18, 1980, now abandoned.

This invention relates to a method of casting a reverse osmosis or ultrafiltration polymeric membrane using different gelation conditions on each side of the membrane.

It has been proposed in U.S. Pat. No. 3,676,193, dated July 11, 1972, "Process for Casting Integrally Supported Tubular Membranes", W. W. Cooper IV and E. M. Shea to cast a tubular membrane directly on to the surface of a porous tubular support by drawing a casting bob upwardly along the bore of the tubular support, while a casting solution flows around the casting bob to coat the tubular support, and then treating the coating by gradually dipping the tubular support in a gelation liquid as it is coated. While the Cooper IV et al process has been shown to be very useful contribution to the art, it has met with limited commercial use because of problems that have been encountered with it.

When the tubular support is dipped into the gelation liquid both sides of the casting solution applied to the tubular support are gelled in approximately the same way, thus forming a membrane with a skin on each side. The skins thus formed are an impediment to, for example, water flux under operating conditions. Furthermore, excessive penetration of the membrane material into the interstices of the porous tubular support reduces the number and size of the flow for liquid permeation. Yet another problem is the possibility of uncontrolled escape of air, which has been trapped in the porous tubular support by the membrane during its formation, giving rise to holes in the membrane and rendering it useless.

In U.S. Pat. No. 4,145,295, dated Mar. 20, 1979, "Cellulose ester ultra-filtration membranes and their manufacture", O. Kutowy, W. L. Thayer and S. Sourirajan, there is described a process for preparing ultra-filtration membranes and the product thereof, in which a selected cellulosic-ester polymer solution is cast into a thin film, at about ambient temperature, partially dried and immersed in a gelation bath at $-20°$ to $+30°$ C. The gelation bath contains a sufficient percentage by volume of ethyl alcohol or other organic polar compound to ensure that a flux rate in excess of the initial minimum is achieved. In this way, ultra-filtration membranes having water flux rates selected from within the approximate range 14–10,000 gals./sq.ft./day at 100 psig and a molecular weight cut off above about 15,000, can be produced.

According to the present invention there is provided in a method of casting a reverse osmosis or ultrafiltration, polymeric membrane on a wall of a porous support having a first side, which will be subjected to a relatively high liquid pressure when in use, and a second side, which will be subjected to a relatively low liquid pressure when in use, wherein the porous support is coated on the first side with a cellulose ester, solvent carrier casting solution to at least partially impregnate the porous support from the first side, the solvent carrier is partially evaporated from the cellulose ester solvent carrier coating to leave a cellulose ester residue impregnation in the porous support, then the cellulose ester residues adjacent the first and second sides are gelled with a gelation liquid comprising a monohydric alcohol, and then the gelation liquid is removed, the improvement comprising gelling the cellulose ester residue adjacent the first side with a gelation liquid which is separate from the gelation liquid used to gel the cellulose ester residue adjacent the second side, the monohydric alcohol mole fractions of the separate gelation liquids, and the temperatures of the separate gelation liquids during gelation, being chosen so that relatively larger pores are gelled in the cellulose ester residue adjacent the second side compared to those in the cellulose ester residue adjacent the first side by the different gelation condition.

Further, according to the present invention there is provided a in method of casting a reverse osmosis or ultrafiltration, tubular, polymeric membrane on an inner, first side, which will be subjected to a relatively high liquid pressure when in use, of an upwardly extending, porous, tubular support, the tubular support having an outer, second side, which will be subjected to a relatively low liquid pressure when in use, and wherein relative movement is caused between the porous support and a casting bob applicator to displace the casting bob applicator along the bore of the porous support while a cellulose ester/solvent-carrier casting solution is fed to the casting bob applicator to at least partially impregnate the porous support from the inner, first side thereof, partially evaporating solvent carrier of the cast solution to leave a cellulose ester residue, then gelling cellulose ester residue adjacent the inner, first side and the outer, second side with a gelation liquid comprising a monohydric alcohol, from the lower end of the porous support to form a tubular, polymeric membrane anchored to the porous support, and then removing the gelation liquid, the improvement comprising, gelling cellulose ester residue adjacent the inner, first side of the porous support with a gelation liquid which is separate from the gelation liquid used to gel the cellulose ester residue adjacent the outer, second side, the monohydric alcohol mole fractions of the separate gelation liquids, and the temperatures of the separate gelation liquids during gelation, being chosen so that relatively larger pores are gelled in the cellulose ester residue adjacent the outer, second side compared to those in the cellulose ester residue adjacent the inner, first side by the different gelation condition.

Preferably, gelation liquid is applied to the second side by means of relative movement between the porous support and a cup-shaped container containing that gelation liquid and having an annular, rubber diaphragm base through which the porous support passes and to which it is sealed in a liquid tight manner.

In the accompanying drawings, which illustrate the prior art and, by way of example, embodiments of the present invention.

Figure 1:
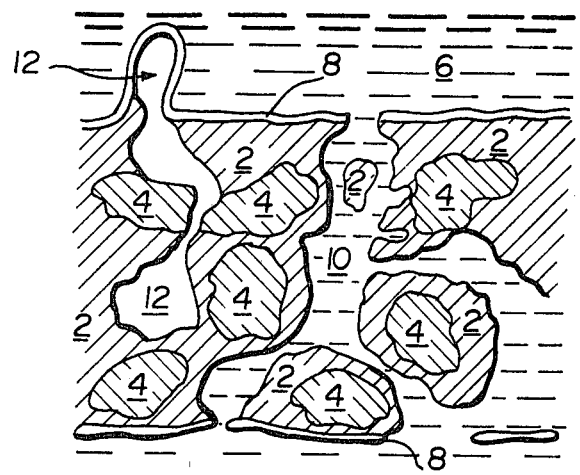
FIG. 1 is an enlarged, diagrammatic, cross-section of a portion of a conventional reverse osmosis or ultrafiltration, tubular, polymeric membrane on a porous tubular support.

Referring now to FIG. 1, as previously stated, when a membrane 2 is cast according to, for example, the Cooper IV et al process on a tubular, porous support 4, and then immersed in a gelation liquid of a gelation bath (not shown), both sides of the membrane 2 are gelled in approximately the same way, thus leaving the membrane 2 with two "skins" 8 which are an impediment to, for example, water flux of water 6 on the low pressure side of the membrane 2 under service conditions. Furthermore, excessive penetration of the membrane 2 into the interstices of the tubular, porous support 4 reduces the number of flow channels 10 for, for example, permeation of water 6. In addition, the escape of trapped air bubbles such as 12 from the tubular, porous support 4, when the membrane 2 is subjected to differential pressures in use, can give rise to holes in the resulting membrane 2 rendering it practically useless.

In contrast, the process according to the present invention consists of a novel treatment of each side of the porous support 4 with separate gelation liquids. As will be described later, monohydric alcohols are used as at least one of the separate gelation liquids with or without water because they (i) do not chemically react with the material of the porous support 4 or affect its mechanical stability, (ii) will maintain the asymmetricity of the porous structure of the membrane 2 when formed (thus avoiding a "skin" on the support side of the membrane), (iii) will allow the desired (varying) degree of membrane adhesion to, and penetration of, the porous support 4, and (iv) can be easily leached out or otherwise removed from the porous support 4 after the membrane gelation step (when the film is integrally set on the porous support 4) without any deleterious effect on the resulting membrane/porous support system.

Also, as will be described later, when the first gelation liquid is not an aqueous solution of monohydric alcohol it may, for example, be substantially pure water with or without inorganic solutes, such as sodium chloride, or organic solutes, such as ketones, amides and esters.

Figure 4:
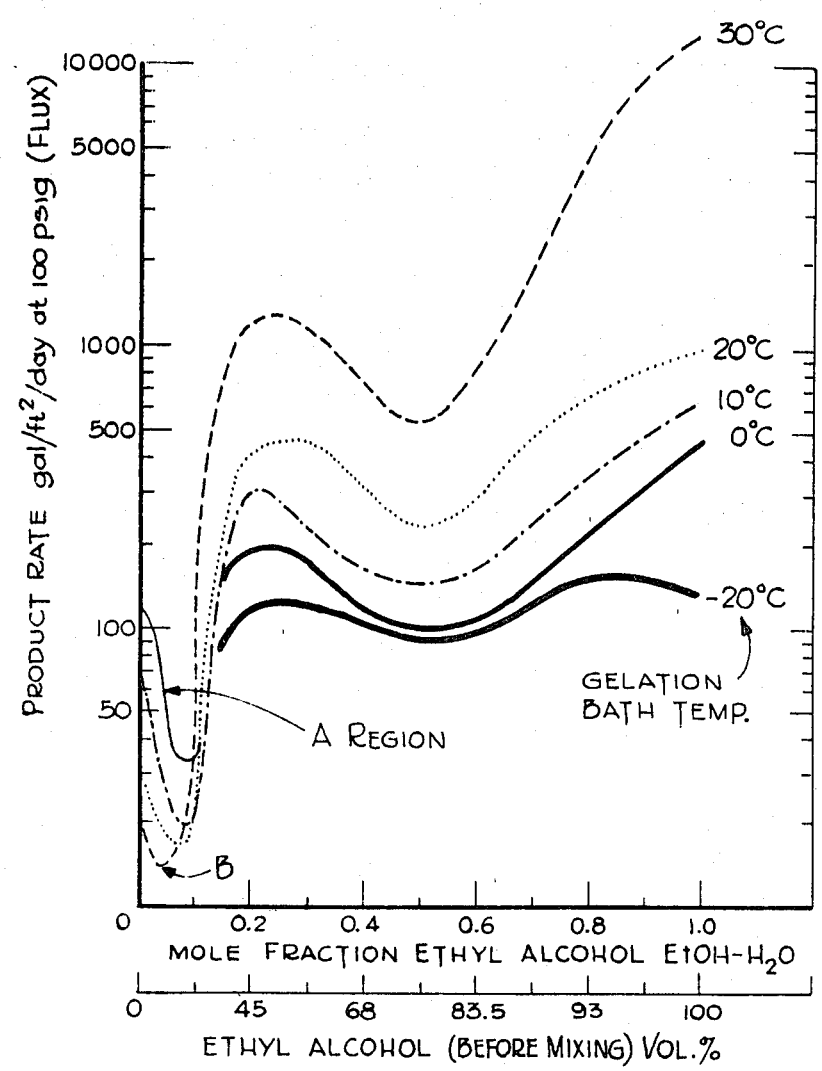
FIG. 4 is a graph relating the known product rate (flux in gal./sq.ft./day at 100 psi) against ethyl alcohol content of a gelation bath, at various gelation bath temperatures.

It will be seen from FIG. 4, that it is known that the flux rate of a membrane is dependant upon the ethyl alcohol mole fraction, and/or the gelation temperature, of the gelation liquid.

The applicants of the present invention have now found that the dependency of the flux rate of a membrane on the monohydric alcohol (e.g. ethyl alcohol) mole fraction, and/or temperature of the gelation liquid can be utilized in a novel manner in that relatively larger pores can be gelled in a casting solution residue adjacent a low pressure side, under service conditions, of a porous support if separate gelation liquids are used to gel the residue from each side of a porous support under different gelation conditions by the separate gelation liquids having, (a) monohydric alcohol mole fractions which are different, the difference being that the monohydric alcohol mole fraction of the gelation liquid, to produce the relatively smaller pores may be any volume % from zero provided, as shown in FIG. 4, the flux rate of casting solution residue that is gelled adjacent one side of a porous support is less than the flux rate of the casting solution residue that is gelled by the other, separate, gelation liquid, and/or (b) different temperatures during gelation to produce different flux rates in the casting solution residue that is gelled provided, as shown in FIG. 4, the gelation temperatures of the same or different separate gelation liquids are selected so that the residue that is gelled adjacent one side of the porous support has a lower flux rate compared to the residue that is gelled adjacent the other side of the porous support.

Figure 2:
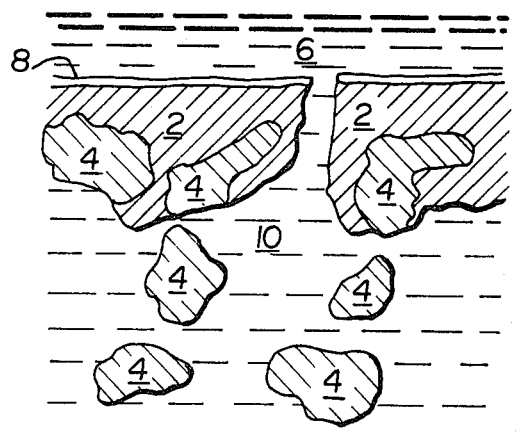
FIG. 2 is a diagrammatic, sectional side view of a portion of one reverse osmosis or ultrafiltration membrane produced according to the present invention.
Figure 3:
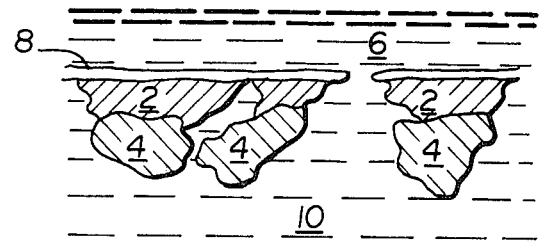
FIG. 3 is a diagrammatic, sectional side view of a portion of a different reverse osmosis or ultrafiltration membrane to that shown in FIG. 2, but also produced according to the present invention.

Integrally supported polymeric membranes according to the present invention are diagramatically represented in FIGS. 2 and 3 where similar parts to those shown in FIG. 1 are designated by the same reference numerals and the previous description is relied upon to describe them.

It will be seen from FIGS. 2 and 3 that the membranes 2, produced according to the present invention, only partially penetrate the porous support 4 and have only one "skin" 8, which is adjacent to the inner surface of the porous support 4. The integrally supported, polymeric membrane shown in FIG. 2 is what is generally obtained by the present invention while, as will be described later, the one shown in FIG. 3 is a special case.

After studying the known relationship of the product rate to the mole fraction ethyl alcohol content of a gelation liquid it occurred to the applicants that it may be possible to use separate gelation liquids for gelling different sides of a polymeric membrane on a porous support so that relatively larger pores are gelled in one side of the membrane by different gelation conditions using gelation liquids that have different monohydric alcohol mole fraction contents and/or different gelation temperatures. While ethyl alcohol is the gelation liquid used in FIG. 4, it was thought that other monohydric alcohols, such as, for example, methyl, propyl, isopropyl and butyl alcohols may be used to create different gelation conditions. In addition it was thought that the gelation liquid for the high pressure side may, for example, also be substantially pure water, alcohol/water mixtures, aqueous solutions of organic or inorganic solutes such as sodium chloride, monohydric alcohols, ketones, amides and esters.

In tests to verify the present invention, the void space in a porous support in the form of a flat sheet, was first impregnated with an appropriate gelation liquid on the low pressure side, and then the surface on which the film was to be cast was thoroughly cleaned so as to expose that surface for adhesion thereto of a cast membrane. This technique was also used to cast membranes along the bores of porous tubular supports. The depth of cleaning of the support surface together with the casting method determines the depth of penetration of the membrane casting solution into the porous support, and consequently the adhesion of the membrane to the support.

In some cases, a special chemical conditioning of the casting surface prior to film casting may be needed in order to promote adhesion of the membrane to the casting surface of the support and cause them to be compatible, as for example, surface hydrolysis of a cellulose triacetate porous support for casting a cellulose diacetate membrane. After casting the membrane on the prepared surface of the porous support, followed by the solvent evaporation and/or membrane gelation by a separate gelation liquid from the high pressure side, the gelation liquid that was impregnated into the low pressure side of the porous support was leached out or otherwise removed, outwardly through the porous support by water (or other solvent), heat or pressure or a combination of such techniques, thus leaving the membrane integrally bonded to one side of the porous support.

When the material of the porous support is compatible with the polymer in the film casting solution such as, for example, when the solvent in the film casting solution is also a solvent for the material of the porous support (for example, a cellulose acetate membrane cast on a cellulose acetate cloth), good surface bonding of the membrane to the porous support can be obtained as shown in FIG. 3 by an appropriate choice of the gelation liquid that is impregnated into the low pressure side of the porous support.

Figure 5:
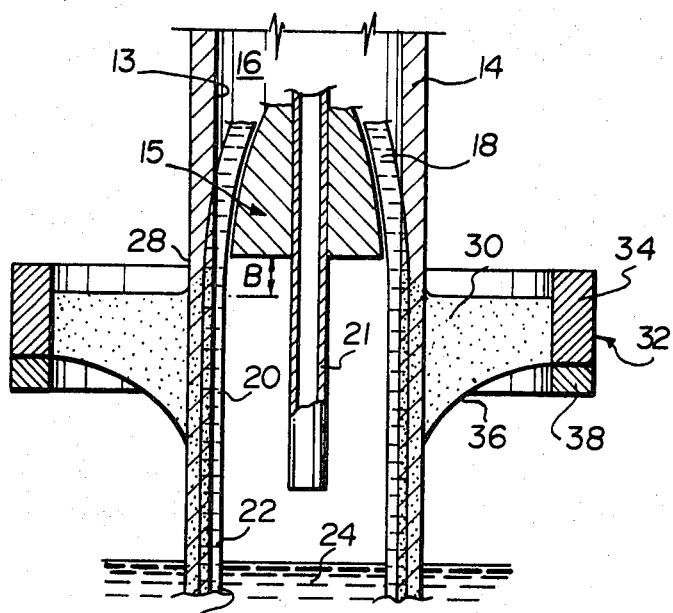
FIG. 5 is a section side view of a portion of a reverse osmosis or ultrafiltration membrane being cast according to one method of the present invention.

In FIG. 5 there is shown another method of casting a reverse osmosis or ultrafiltration polymeric membrane on an inner, first side 13 which will be subjected to a relatively high liquid pressure when in use, of an upwardly extending, porous tubular support 14, the tubular support 14 having an outer, second side 28, which will be subjected to a relatively low liquid pressure when in use, and wherein relative movement is caused between the porous support 14 and a casting bob applicator 15 to displace the casting bob applicator 15 along the bore 16 of the porous support 14 while a cellulose ester solvent carrier casting solution 18 is fed to the casting bob applicator 15 to at least partially impregnate the porous support 14 from the first side 13 thereof, partially evaporating solvent carrier of the cast solution 20 by, for example, feeding air down a pipe 21, to leave a cellulose ester residue 22, then gelling the cellulose ester residue 22 adjacent the inner, first side 13 and the outer, second side 28 with gelation liquid from the lower end of the porous support 14 to form a tubular, polymeric membrane 26 anchored to the support 14, and then removing the gelation liquid 24, the improvement comprising, cellulose ester residue 22 adjacent an inner, first side 13 of the porous support 14 is gelled with a gelation liquid 24 which is separate from the gelation liquid 30 used to gel cellulose ester residue 22 adjacent the outer, second side 28, and the monohydric alcohol mole fractions of the separate gelation liquid 24, 30 and the temperatures of the separate gelation liquid 24, 30 during gelation, are chosen so that relatively larger pores are gelled in the cellulose ester residue adjacent the outer, second side 28 to those in the cellulose ester residue adjacent the inner, first side 13 by the different gelation condition.

Figure 6:
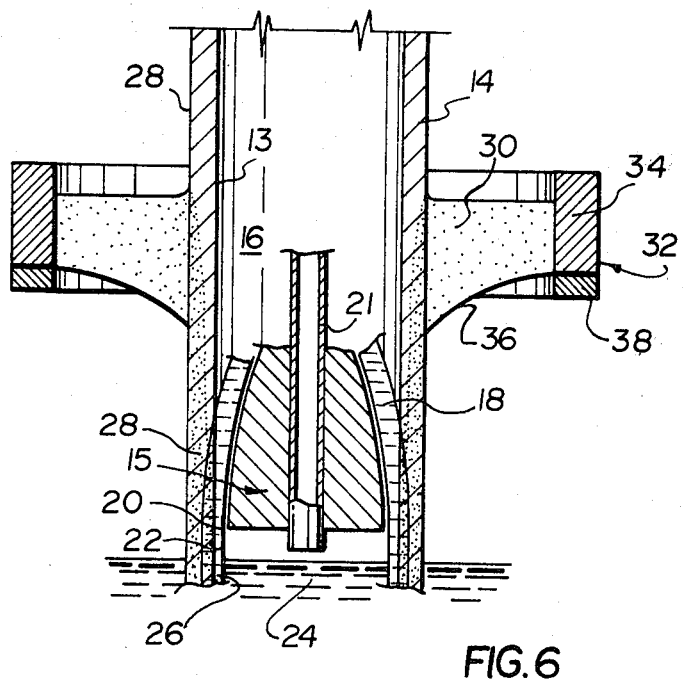
FIG. 6 is a section side view of a portion of a reverse osmosis or ultrafiltration membrane being cast according to a different method of the present invention than that shown in FIG. 5.

It will be noted that in FIG. 5, the porous support 14 is partially impregnated with the gelation liquid 30 after the porous support 14 has been impregnated with the casting solution 18, while in FIG. 6, the support 14 is partially impregnated with the gelation liquid 30 before the porous support 14 is impregnated with the casting solution 18.

The gelation liquid 30 is applied to the porous support 14 by means of a cup-shaped container 32 comprising an annular, metal side 34 with an annular diaphragm base 36 of, for example, rubber or polytetrafluoroethylene forming an applicator for the gelation liquid 30 and sealed in a liquid tight manner to the side 34 by an annular, metal ring 38.

The gelation liquid 30 is applied to the porous support 14 by relative movement between the porous support 14 and the cup-shaped container 32.

When the alcohol mole fractions of the separate gelation liquids 24 and 30 are different, the gelation liquid 30 preferably has a monohydric alcohol mole fraction at least 0.1 in order that it will maintain the asymmetricity of the porous structure of the membrane 26 when formed (thus avoiding a "skin" on the support side of the membrane).

Examples of tests used to verify the present invention will now be described using the apparatus shown in FIG. 5, for making porous cellulose acetate membranes 26 integrally held on porous supports 14. The porous supports 14 used in these tests were porous (10 micron voids) high density polyethylene tubes, 30.1 mm outside diameter, 6.35 mm wall thickness and 1.3 m long. The composition of the film casting solution used in these tests was:

| | |
|---|---|
| Cellulose acetate (Eastman 400-25) | 14.8 wt. % |
| Acetone | 63.0 wt. % |
| Water | 19.9 wt. % |
| Magnesium perchlorate | 2.3 wt. % |

In all of the tests, the membranes 26 were cast by holding the casting bob 15 stationary and letting the porous support 14 move in a downward direction under controlled speed. The casting solution 18 was supplied under pressure to the casting bob 15. It was found that by varying this pressure, the penetration of the casting solution 18 into the porous support 14, and hence the adhesion of the membrane 26 to the porous support 14, can be controlled. Details of these tests of integrally supported ultrafiltration membranes 26 are given in the following Tables I and II.

TABLE I

| | GELATION LIQUID 24 | | GELATION LIQUID 30 | | MEMBRANE PERFORMANCE | | | | | |
|---|---|---|---|---|---|---|---|---|---|---|
| Test No. | Monohydric Alcohol % by volume | Gelation Temperature °C. | Monohydric Alcohol % by volume | Temperature °C. | Pure Water Permeation Rate gfd | Product Flux Rate Through Membrane gfd | Operating Pressure psi | Temperature of Feed °C. | % Sep. | Test Component |
| 1 | 33 | 22 | — | — | 80 | 32 | 50 | 40 | 100 | 18% Oil |
| 2 | 35 | 22 | — | — | 63 | 26 | 25 | 40 | 100 | 12% Oil |
| 3 | 40 | 22.5 | — | — | 77 | 29 | 20 | 25 | 100 | Coal Fines |
| 4 | 30 | 22 | 50 | 22 | ~100 | ~75 | 25 | 22 | 100 | 2% Coal Fines |
| 5 | 35 | 22 | 50 | 22 | ~100 | ~70 | 25 | 25 | 100 | 15% Oil |
| 6 | 35 | 22 | 95 | 30 | ~250 | ~100 | 25 | 20 | 100 | 2% Coal |
| 7 | 40 | 22 | 95 | 30 | ~500 | 118 | 25 | 18 | 100 | ~5% Clay |
| 8 | 45 | 22 | 95 | 30 | +1000 | 139 | 25 | 20 | 100 | 2% Coal |

TABLE I-continued

| | GELATION LIQUID 24 | | GELATION LIQUID 30 | | MEMBRANE PERFORMANCE | | | | | |
|---|---|---|---|---|---|---|---|---|---|---|
| Test No. | Monohydric Alcohol % by volume | Gelation Temperature °C. | Monohydric Alcohol % by volume | Temperature °C. | Pure Water Permeation Rate gfd | Product Flux Rate Through Membrane gfd | Operating Pressure psi | Temperature of Feed °C. | % Sep. | Test Component |
| 9 | 33 | 0 | 33 | 22 | ~88 | 63 | 25 | 22 | 100 | 8% Oil |

NOTE
Test Nos. 1 to 3 were carried out using membranes that had been gelled without different gelation conditions, while tests Nos. 4 to 9 were carried out using membranes that had been gelled with different gelation conditions.

TABLE II

| Test No. | Gelation Liquid 30 | Differential External Pressure for Disengaging Membrane 26 From Inside Surface of Porous Support Tube 14 | Water Flux at 20 psi Operating Pressure at 99.9% Oil Separation, Gal/Day.ft$^2$* |
|---|---|---|---|
| 1 | None (no change in gelation conditions) | ~90 psi | 28 |
| 2** | 50% Ethyl Alcohol by volume in EtOH-water solution | ~35 psi | 100 |
| 3** | 50% Ethyl Alcohol by volume in EtOH-water solution | ~60 psi | 100 |
| 4** | 95% Ethyl Alcohol by volume in EtOH-water solution | >90 psi | 120 |

*data after 3 hours of continuous operation (essentially steady state conditions).
**Membranes 2, 3 and 4 have progressively higher penetration of polymer into the porous support.

The adhesion of the membrane 26 to the porous support tube surface was tested by applying water pressure on the outside of the tube 14, while keeping the pressure on the membrane side of the tube at atmospheric pressure. It was found that the outside pressures at which the membranes disengaged themselves from the porous support surface were 35 to 90 psi as shown in Table II. From this it will be seen that the greater the impregnation of the gelation liquid 30, into the support, the lower the impregnation of the casting solution and so the lower the pressure required to disengage the membrane from the support. Thus the extent of penetration of gelation liquid into the porous support controls the penetration into the inner, first side of the support.

The first set of supported membranes (tests 1, 2 and 3 in Table I) was produced without different gelation conditions. For the second set of supported membranes, (tests 4 to 9 in Table I) the relatively-larger-pore-forming gelation liquid 30 used was an ethyl alcohol-water solution with an alcohol content either greater than that used in the membrane gelation liquid 24, preferably greater than 50% by volume, or at a higher temperature, or both. The voids in the porous support tube 14 were impregnated with the gelation liquid 30 as the membrane was being cast by the methods described with reference to FIGS. 5 and 6.

The preferred alcohol content of 50% by volume in the gelation liquid 30 specified above is for the casting solution composition used in these examples. For other casting solution compositions involving cellulose acetate the desirable alcohol content in the gelation liquid 30 may be different; in general, this alcohol concentration is preferably that necessary to give a water flux corresponding to the maximum following the initial minimum shown in FIGS. 2a and 3 in U.S. Pat. No. 4,145,295, dated Mar. 20, 1979, O. Kutowy et al.

Using the methods described with reference to FIGS. 2 and 3, the gelation liquid 30 continuously percolates into the voids of the porous support tube 14 by capillary action aided by, if desired, a slight external pressure from a source not shown. The casting bob 15 and the cup-shaped container 32 were held stationary and the support tube 14 with the membrane 22 cast on it was lowered into the gelation liquid 24. The penetration of the casting solution 18 into the porous support tube 14 (and consequently the anchorage of the membrane to an incompatible porous support tube 14) is relatively greater with the casting bob 15 at the position shown in FIG. 5. As the distance B in FIG. 5 between the upper level of the gelation liquid 30 and the lower end of the casting bob 15 is increased, the degree of penetration of the casting solution 18 into the porous support tube 14 tends to increase. This is indicated by the data given in Table II on the differential external pressure needed for disengagement of the film from the inside surface of the porous tubular support 14. After the gelation step, the gelation liquid and pore former and the residual solvent in the polymer casting solution, in the porous support, were leached out completely by pumping water under pressure in the bore of the porous tube 14 through the membrane 26.

In different embodiments of the present invention the gelation liquid 30 is sprayed on to the porous support tube 14.

In other embodiments of the present invention the membrane is cast on the outer side of the porous support tube 14 in which case cellulose ester residue adjacent the inner side of the porous support tube 14 is gelled with the gelation liquid 30.

In other embodiments of the present invention the reverse osmosis or ultrafiltration, polymeric membrane is cast on the wall of a porous support in the form of a flat sheet.

The experimental data presented in Table I show that the membranes obtained by different gelation conditions give superior water flux characteristics compared to those obtained without different gelation conditions, which illustrates the practical utility of the present invention.

We claim:
1. In a method of casting a reverse osmosis or ultrafiltration, polymeric membrane on a wall of a porous support having a first side which will be subjected to a relatively high liquid pressure when in use, and a second side which will be subjected to a relatively low liquid pressure when in use, wherein the porous support is coated on the first side with a cellulose ester, solvent carrier, casting solution to at least partially impregnate the porous support from the first side, the solvent carrier is partially evaporated from the cellulose ester, solvent carrier coating to leave a cellulose ester residue impregnation in the porous support, then the cellulose ester residue adjacent the first and second sides is gelled with a gelation liquid comprising a monohydric alcohol, and then the gelation liquid is removed, the improvement comprising gelling the cellulose ester residue adjacent the first side with a gelation liquid which is separate from the gelation liquid used to gel the cellulose ester residue adjacent the second side, the monohydric alcohol mole fractions of the separate gelation liquids and the temperatures of the separate gelation liquids during gelation being chosen so that relatively larger pores are gelled in the cellulose ester residue adjacent the second side compared to those in the cellulose ester residue adjacent the first side by the different gelation conditions.

2. In a method of casting a reverse osmosis or ultrafiltration, tubular, polymeric membrane on an inner, first side which will be subjected to a relatively high liquid pressure when in use, of an upwardly extending, porous, tubular support, the tubular support having an outer, second side which will be subjected to a relatively low liquid pressure when in use, and wherein relative movement is caused between the porous support and a casting bob applicator to displace the casting bob applicator along the bore of the porous support while a cellulose ester/solvent-carrier casting solution is fed to the casting bob applicator to at least partially impregnate the porous support from the inner, first side thereof, partially evaporating solvent carrier of the cast solution to leave a cellulose ester residue, then gelling cellulose ester residue adjacent the inner, first side and the outer, second side with a gelation liquid comprising a monohydric alcohol, from the lower end of the porous support to form a tubular, polymeric membrane anchored to the porous support, and then removing the gelation liquid, the improvement comprising gelling cellulose ester residue adjacent the inner, first side of the porous support with a gelation liquid which is separate from the gelation liquid used to gel cellulose ester residue adjacent the outer, second side, the monohydric alcohol mole fractions of the separate gelation liquids, and the temperatures of the separate gelation liquids during gelation being chosen so that the relatively larger pores are gelled in the cellulose ester residue adjacent the outer, second side compared to those in the cellulose ester residue adjacent the inner, first side by the different gelation conditions.

3. In the method claimed in claim 2, the improvement comprising applying gelation liquid to the outer, second side by means of relative movement between the porous support and a cup-shaped container containing gelation liquid and having an annular, rubber diaphragm base through which the porous support passes sealed in a liquid tight manner.

4. In the method claimed in claim 2, the improvement comprising controlling the depth of impregnation of the casting solution into the inner, first side of the porous support by regulating the pressure of the casting solution as it is impregnating the inner, first side of the porous support.

5. In the method claimed in claim 1, the improvement comprising applying gelation liquid to the outer, second side under a positive hydrostatic head of gelation liquid, and controlling the depth of the penetration of the casting solution into the inner, first side of the porous support by regulating the positive hydrostatic head of the gelation liquid on the outer, second side.

* * * * *